United States Patent
Matsumoto

(10) Patent No.: US 6,462,290 B1
(45) Date of Patent: Oct. 8, 2002

(54) ON-VEHICLE COMBINATION SWITCH

(75) Inventor: Tsuyoshi Matsumoto, Tokyo (JP)

(73) Assignee: Niles Parts Co., Ltd. (JP)

( * ) Notice: Subject to any disclaimer, the term of this patent is extended or adjusted under 35 U.S.C. 154(b) by 0 days.

(21) Appl. No.: 09/986,428

(22) Filed: Nov. 8, 2001

(30) Foreign Application Priority Data

Nov. 14, 2000 (JP) ....................................... 2000-347061

(51) Int. Cl.⁷ ............................................... H01H 9/00
(52) U.S. Cl. ..................................... 200/61.54; 439/15
(58) Field of Search ......................... 200/61.27, 61.54, 200/61.55, 61.56; 439/15, 24, 164

(56) References Cited

U.S. PATENT DOCUMENTS

| | | | | |
|---|---|---|---|---|
| 5,936,215 A | * | 8/1999 | Masuda et al. | 200/61.3 |
| 5,977,494 A | * | 11/1999 | Sano et al. | 200/61.54 |
| 5,977,495 A | * | 11/1999 | Akimoto | 200/61.54 |
| 6,127,638 A | * | 10/2000 | Masuda et al. | 200/61.27 |
| 6,172,314 B1 | * | 1/2001 | Uehira et al. | 200/61.54 |
| 6,222,142 B1 | * | 4/2001 | Sano | 200/61.54 |
| 6,246,128 B1 | * | 6/2001 | Sugata | 200/61.54 |

FOREIGN PATENT DOCUMENTS

JP  63-196755  12/1988  ........... B60R/16/02

* cited by examiner

Primary Examiner—Michael Friedhofer
(74) Attorney, Agent, or Firm—Rader, Fishman & Grauer PLLC; Ronald P. Kananen, Esq.

(57) ABSTRACT

An on-vehicle combination switch has a base that is attached to a steering column and formed with first and second recesses on left and right sides thereof, first and second switch units attached into the first and second recesses, respectively, and a rotary connector that connects between a steering wheel and a vehicle body through a flat cable wound in a space defined by a stator housing and a rotor housing rotatably assembled to the stator housing. The first and second switch units have first and second connectors oriented toward the first and second recesses, respectively. A conductor is provided to make electrical connection between the first and second switch units. The conductor has first and second relay connectors connected to both ends thereof. The first and second relay connectors fit to the first and second connectors, respectively. The conductor is provided in the stator housing.

5 Claims, 8 Drawing Sheets

Fig.9
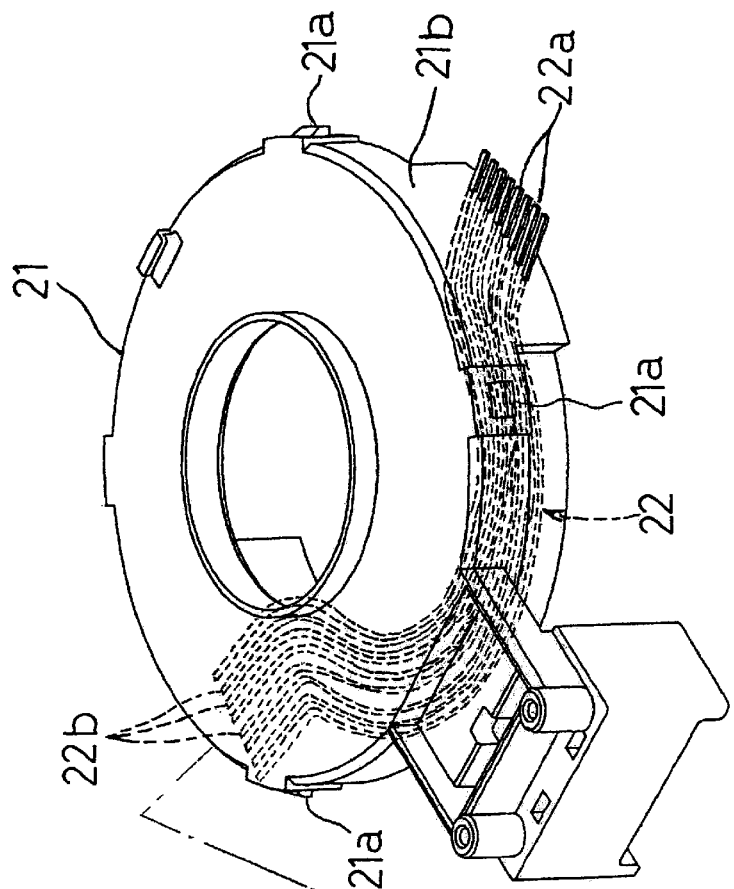
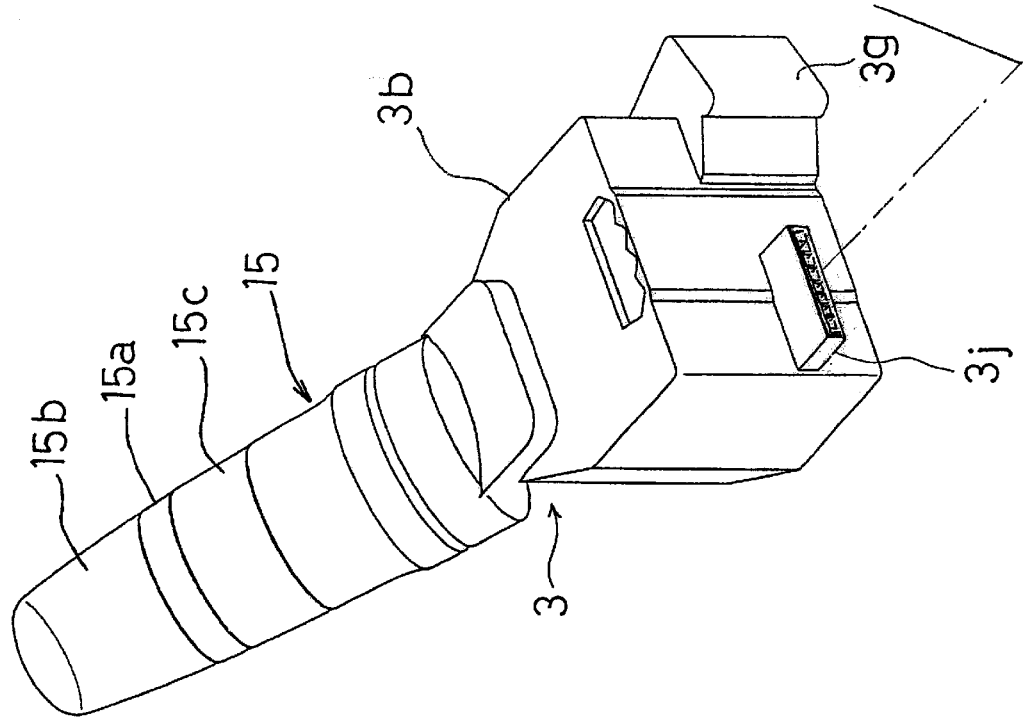

ON-VEHICLE COMBINATION SWITCH

BACKGROUND OF THE INVENTION

1. Field of the Invention

The present invention relates to an on-vehicle combination switch having a base, a first switch unit, a second switch unit, and a rotary connector, wherein the first switch unit, second switch unit, and the rotary connector are mounted on the base and the rotary connector electrically connects between a steering wheel and a vehicle body. The present invention relates more particularly to an on-vehicle combination switch in which either the first switch unit or the second switch unit is provided with an integrated connector assembly connected to a power supply.

2. Description of the Related Art

Japanese Utility Model Laid open No. 63-196755 discloses one such conventional on-vehicle combination switch. This conventional combination switch includes a switch unit having a connector for lighting purpose and another switch unit having connectors for a wiper and others. These two switch units are firmly secured to the switch base by means of screws. A horn shoe provided on the switch base is connected to a connecting portion of one of the switch units. The connector for the lighting purpose of the switch unit is connected to, for example, a power supply.

However, the aforementioned conventional combination switch include two switch units mounted on the left and right sides of the switch base, each switch unit having a plurality of connectors accommodated therein. This construction requires many connectors for electrical connection, more assembly time for electrical connection, and more associated components, thereby increasing manufacturing costs.

Mounting a rotary connector on the base of the combination switch further increases the number of associated connectors, associated components, and assembly time, and makes the structure more complex accordingly.

A recent on-vehicle combination switch has a rotary connector mounted on the base for electrically connecting between the vehicle body and the steering wheel. The rotary portion of the rotary connector that is connected to the vehicle body is disposed on the outer surface of the base. Among many components provided on the outer surface of the base are the connector portion of the rotary connector, the lighting side connector, and the wiper side connector, which are separately located. When the connectors are assembled to the vehicle and cables of the connectors are routed, the wires tend to be caught by the surroundings so that the assembly operation is difficult.

Another type of conventional combination switch has a rotary connector formed in one piece with the base of the combination switch. The rotary connector includes a rotor housing rotatably mounted on an upper side of the base and a stator housing fixedly mounted on a lower side of the base, the base forming part of the stator housing. With this type of combination switch, the rotary connector occupies most of the areas on the upper and lower sides of the base, leaving very limited areas through which the cables can be routed.

SUMMARY OF THE INVENTION

The present invention was made in view of the aforementioned prior art drawbacks.

An object of the present invention is to provide a combination switch with a base on which a rotary connector is mounted and to which first and second switch units are fittingly assembled. The combination switch is provided with a conductor that electrically connects between the first and second switch units. Thus, the present invention provides an on-vehicle combination switch in which electrical connection to the vehicle body can be simplified.

An on-vehicle combination switch includes a base that is attached to a steering column and has a first recess and a second recess formed in left and right sides thereof; a first switch unit attached into the first recess; a second switch unit attached into the second recess; and a rotary connector that connects between a steering wheel and a vehicle body through a flat cable wound in a space defined by a stator housing and a rotor housing rotatably assembled to the stator housing. The first switch unit has a first connector oriented toward the first recess and the second switch unit has a second connector oriented toward the second recess. A conductor is provided to make electrical connection between the first switch unit and the second switch unit. The conductor has a first relay connector at one end thereof and a second relay connector at the other end thereof. The first relay connector fitting to the first connector and the second relay connector fitting to the second connector. The conductor is provided in the stator housing of the rotary connector.

The stator housing has a cable cover that covers the conductor.

The cable cover has an engagement strap through which the cable cover is attached to an underside of the base or the stator housing. The conductor includes a cable having the first relay connector at one end thereof and the second relay connector at the other end thereof, the cable being covered by the cable cover. The first relay connector faces the first switch unit and the second relay connector faces the second switch unit.

The first relay connector is disposed at a lower portion of the first recess and the second relay connector is disposed at a lower portion of the second recess, the first and second relay connectors having base portions and tips, the base portions being supported on either the cable cover or the stator housing so that the first and second relay connectors are marginally movable upward and downward and laterally, and the tips projecting radially outwardly of the stator housing.

The base has a stator housing of the rotary connector, the stator housing having an accommodating groove formed in a top surface thereon, the accommodating groove accommodating the conductor therein.

The accommodating groove in the stator housing is closed by a slide sheet that lies under the flat cable of the rotary connector.

The base has a stator housing of the rotary connector, the stator housing having the conductor and first and second relay connectors secured thereto, the first and second relay connectors being part of the conductor and projecting radially outwardly from an outer circumferential surface of the stator housing, Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 9 is an exploded perspective view of a pertinent portion of a third embodiment.

DETAILED DESCRIPTION OF THE INVENTION

First Embodiment

Figure 1:
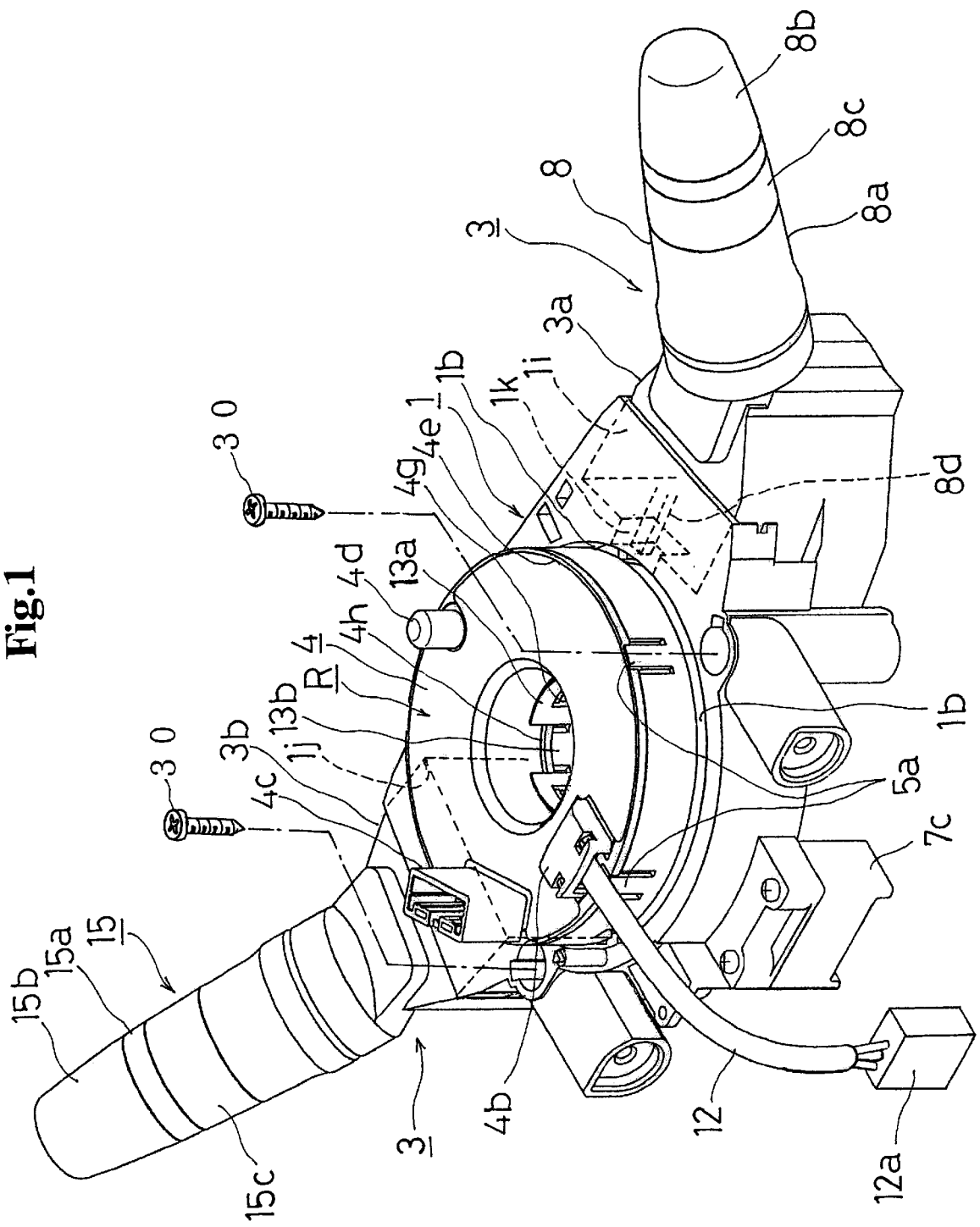
FIG. 1 is a perspective view illustrating a first embodiment of the invention.

A combination switch 3 has a base 1 with a steering shaft 2 extending through the middle of the base 1. The base 1 is fixed to a bracket, not shown, of steering column, not shown, by means of a screw 30 (FIG. 1) and a fastening strip 1c (FIG. 2). The combination switch 3 includes the base 1, a first switch unit 3a, and a second switch unit 3b.

There is provided a rotary connector R on the base 1, the rotary connector R connecting between the steering wheel (not shown) and the vehicle body. As shown in FIG. 2, the base 1 is formed with a hollow cylinder 1a in the middle thereof and an annular groove 1b formed around the hollow cylinder 1a. The annular groove 1b rotatably receives a lower portion of a side housing 5, which engages the rotor housing 4 of the rotary connector R. The base 1 has on the left and right sides thereof a first recess 1i and a second recess 1j, respectively, into which the first switch unit 3a and the second switch unit 3b are fitted, respectively.

Figure 2:
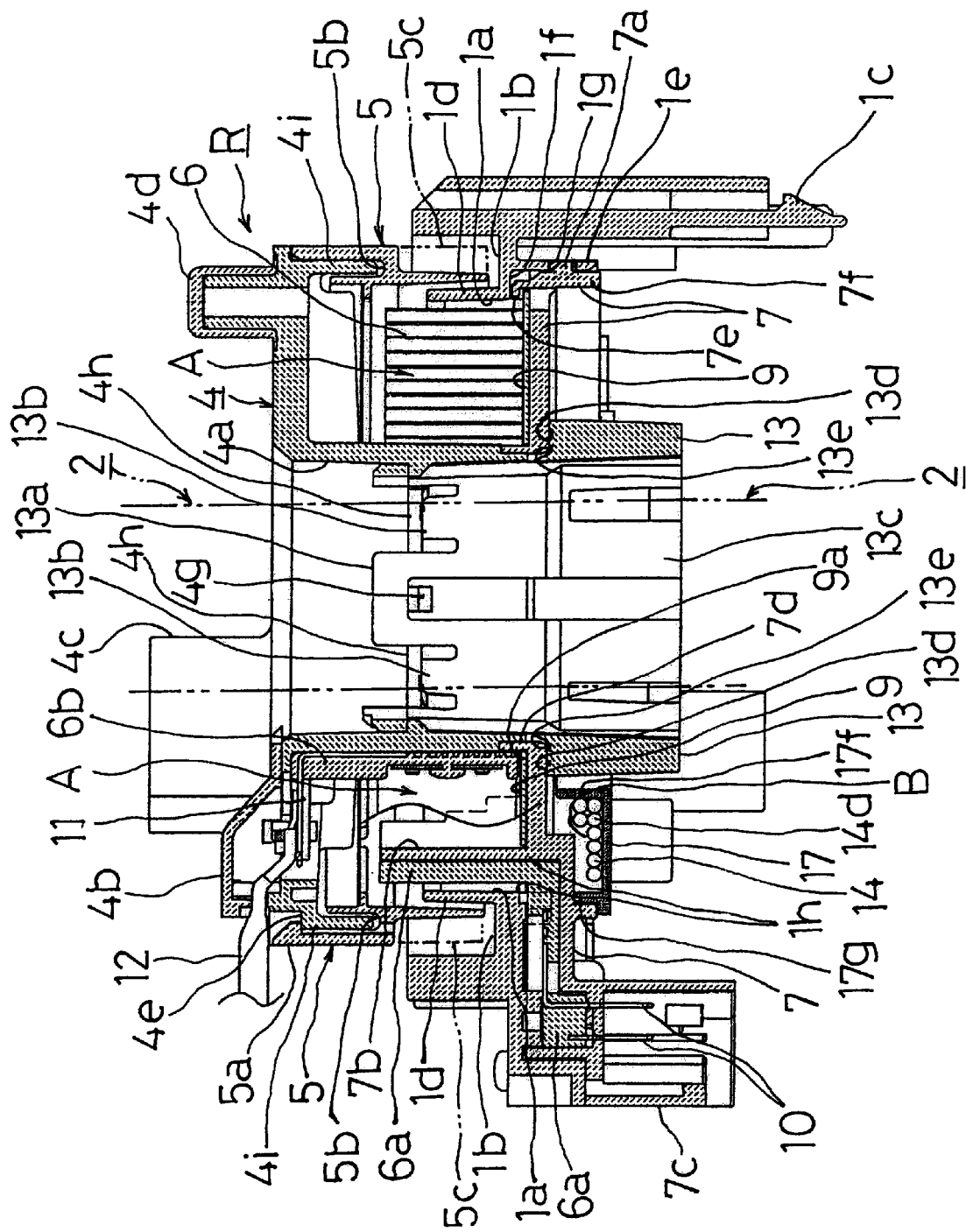
FIG. 2 is a central longitudinal cross-sectional view of the first embodiment.

For a right-hand drive car that has a steering wheel on the right side of the vehicle body, as shown in FIG. 1, the combination switch 3 has the first switch unit 3a that is, for example, in the form of a turn signal switch 8 and is fitted into the first recess 1i formed on the right side of the base 1. The second recess 1j on the left side of the base 1 fittingly receives the second switch unit 3b that includes, for example, a wiper/washer switch 15.

The embodiment will be described in terms of the combination switch 3 designed for a right-hand drive car having a steering wheel on the right side of the vehicle body. For a left-hand drive car having a steering wheel on the left side of the vehicle body, all of the associated components should be made symmetrical to those for the right-hand drive car.

An operating lever 8a of the turn signal switch 8 incorporates, for example, a knob 8b of a lighting switch, and a knob 8c of a fog lamp switch. Operating the lever 8a upward and downward enables selection between a passing switch and a main dimmer switch. The turn signal 8 has an operating lever 8a that is assembled to the first switch unit 3a, the operating lever 8a being adapted to pivot up and down and left and right.

An operating lever 15a of the wiper/washer switch 15 has, for example, a knob 15b for operating an intermittent volume of the wiper switch, a knob 15c for operating a rear wiper/washer switch. Operating the lever 15a forward and rearward controls the operating speed of the wiper. Operating the lever 15a upward and downward controls the operation of the washer switch.

As shown in FIG. 2, the cylinder 1a includes an upper annular wall 1d, and a lower annular wall 1e continuous to the upper annular wall 1d. The upper annular wall 1d covers the outer circumference of a spiral flat cable 6. The lower annular wall is engaged with the stator housing 7. There is a stepped portion 1f between the upper annular wall 1d and the lower annular wall 1e. The stator housing 7 is disposed at the lower side of the stepped portion 1f. The lower annular wall 1e has an engagement portion 1g formed near the stepped portion 1f, the engagement portion 1g engaging a tongue-shaped engagement portion 7a formed in the stator housing 7. When the portion 1f engages the engagement portion 7a, the base 1 fits into the stator housing 7.

Figure 7:
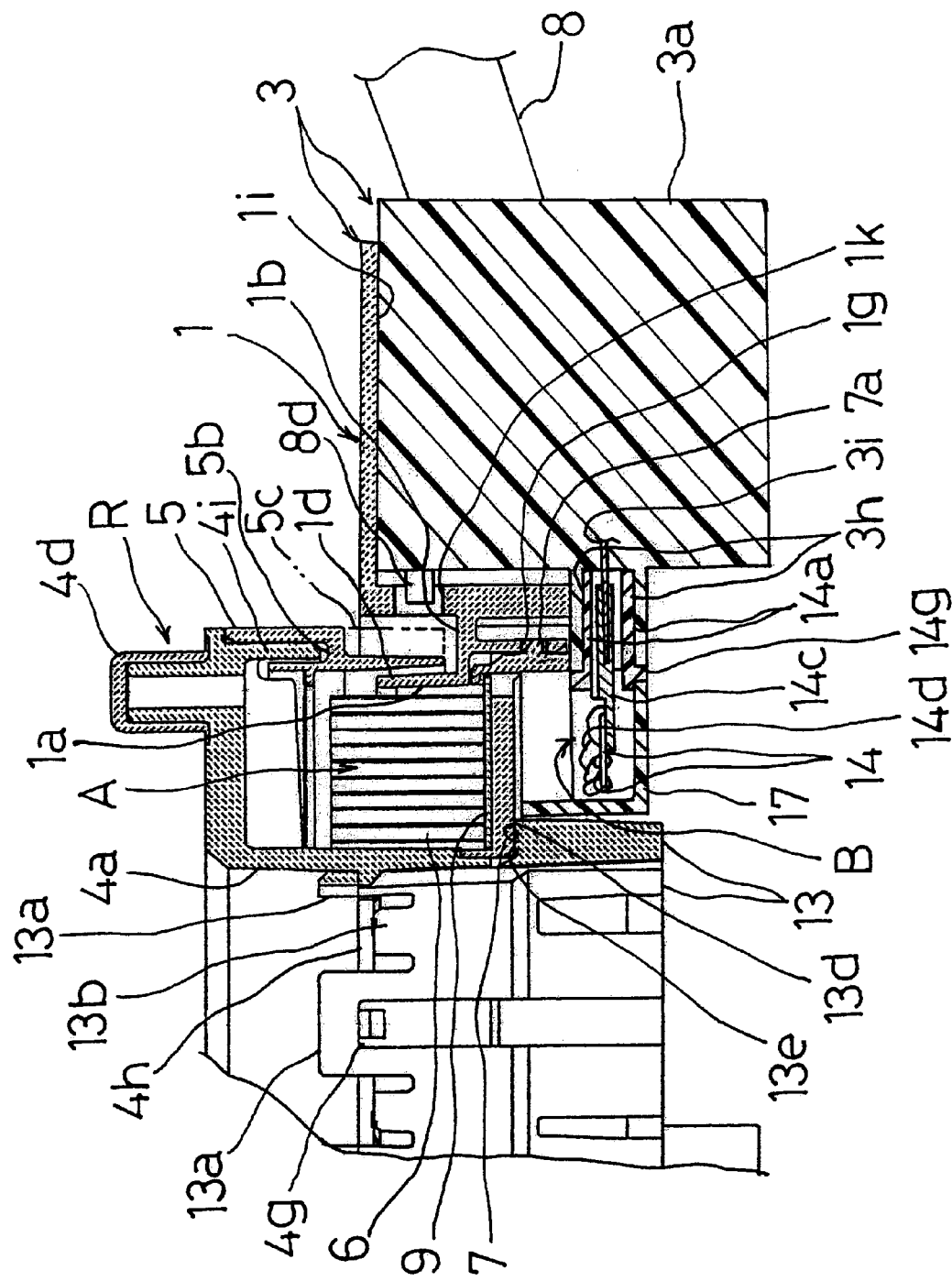
FIG. 7 is a general cross-sectional view of a pertinent portion, illustrating the a connector and a first relay connector connected to each other.

As shown in FIGS. 1 and 7, the annular wall that defines the annular groove 1b has cutouts 1k formed therein through which the annular groove 1b communicates with the first recess 1i and second recess 1j, respectively. A cancel claw 8d of the turn signal switch 8 extends into and retracts from the annular groove 1b through the cutout 1k. When the operating lever 8a is operated to pivot forward or rearward, the cancel claw 8d moves into a circular path in which the cancel cam 5c rotates. When the steering wheel is operated to rotate in a reverse direction, the cancel claw 8d abuts the cancel cam 5c to cause the turn signal switch 8 to return to its initial OFF position.

Since the base 1 has the first and second recesses 1i and 1j having the cutouts 1k through which the cancel claws 8d can extend into and retract from the annular groove 1b, the base 1 can be applied to both right-hand drive cars and left-hand drive cars. For the right-hand drive cars, the turn signal switch 8 is inserted into the first recess 1i so that operating the lever 8a causes the cancel claw 8d to extend into and retract from the annular groove 1b through the cutout 1k. For the left-hand drive cars, the turn signal switch 8 is inserted into the second recess 1j on the left side so that operating lever 8a causes the cancel claw 8d to extend into and retract from the annular groove 1b.

The stator housing 7 is disposed on the bottom of the hollow cylinder 1a. The slide sheet 9 is formed of, for example, oleoresin and shaped thin ring plate, and placed on the stator housing 7 between the cylinder 1a and a cylindrical portion 4a of the rotor housing 4 as shown in FIGS. 2 and 7. The slide sheet 9 facilitates the sliding movement of the flat cable 6 placed on the slide sheet 9.

As shown in FIG. 2, the slide sheet 9 has a hole 9a formed in the middle thereof. The hole 9a fits an inner edge 7d that projects from the inner upper surface of the stator housing 7. The outer circumferential edge of the slide sheet 9 fits between the top surface of the stator housing 7 and an L-shaped fastening projection 7e so that the slide sheet 9 is firmly held in position.

Figure 3:
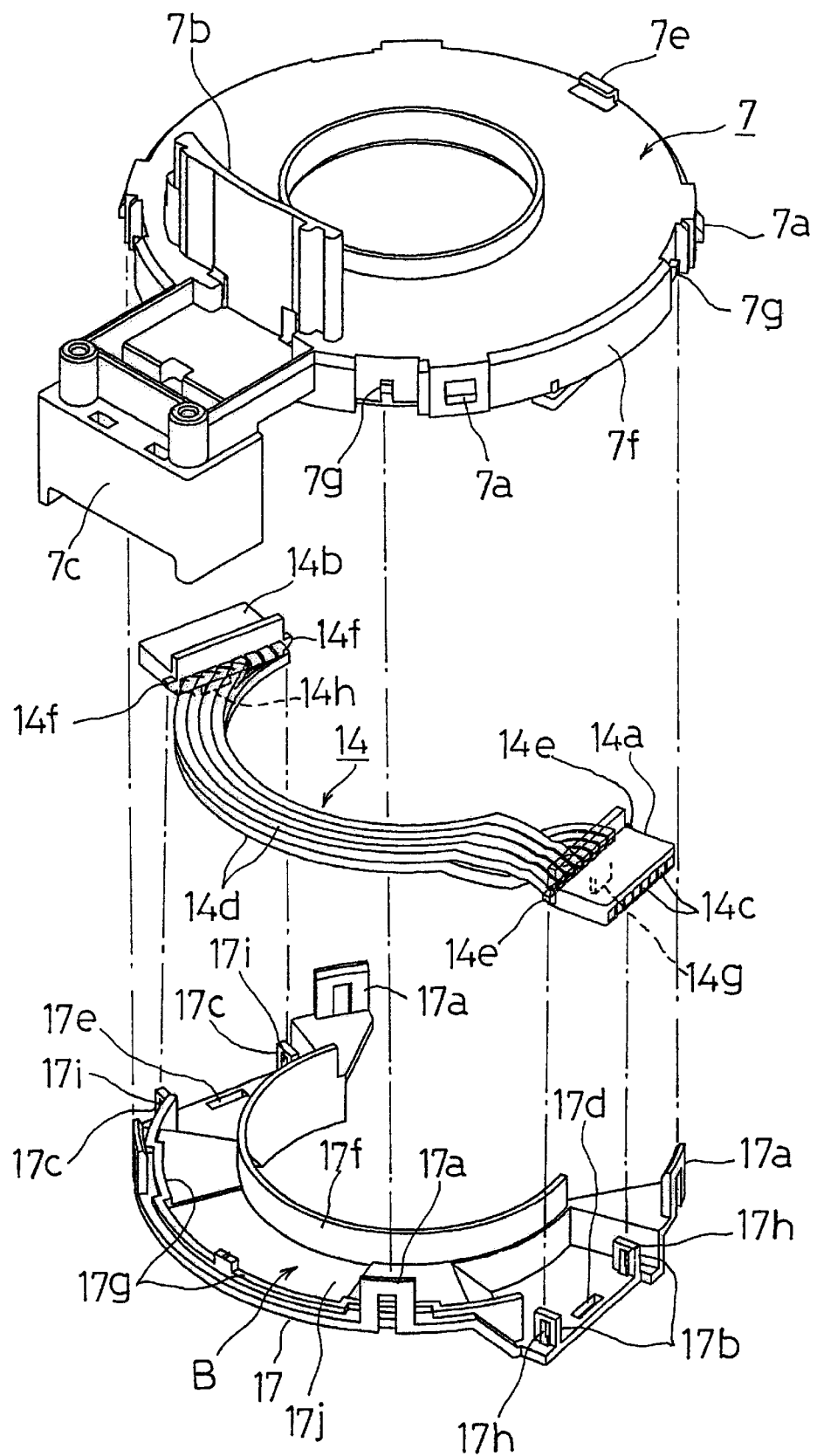
FIG. 3 is an exploded perspective view of a pertinent portion of the first embodiment.
Figure 6:
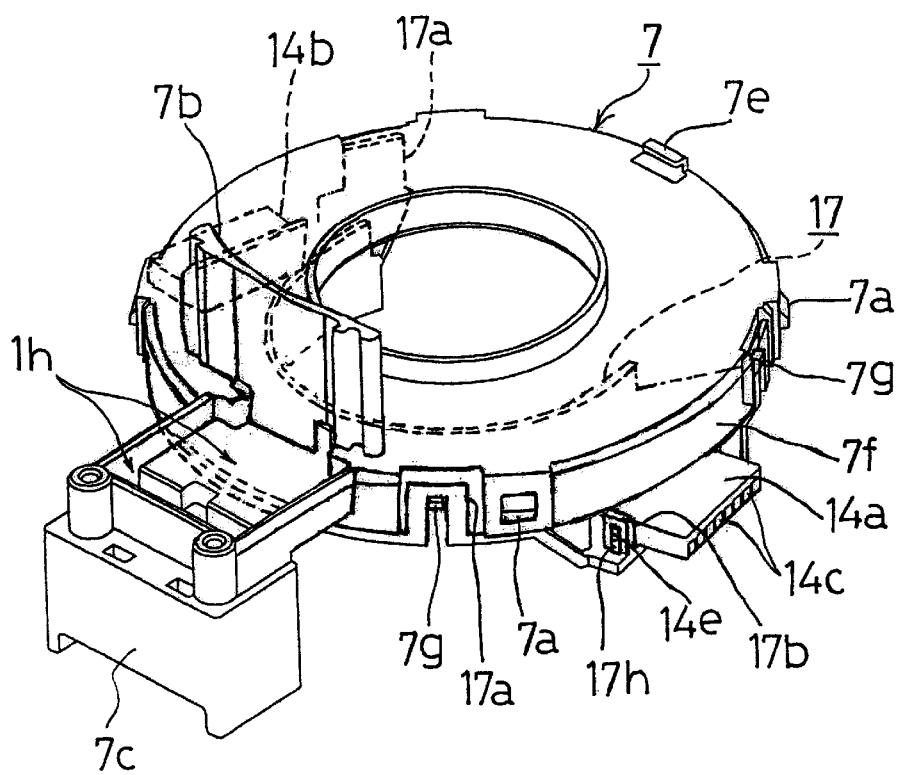
FIG. 6 is a perspective view of a stator housing according to the first embodiment when a cable cover and a conductor have been assembled thereto.

A generally arcuate guide wall 7b stands upright from the bottom of the cylinder 1a as shown in FIGS. 2, 3, and 6, and supports a terminal block 6a on its outer surface and the flat cable 6 on its inner surface. There is provided a fitting portion 1h on the outside of the guide wall 7b as shown in FIGS. 2 and 6. The fitting portion 1h receives the bottom portion of the generally L-shaped terminal block 6a connected to an outer end of the flat cable 6.

The terminal block 6a is insert-molded from an insulation resin with the terminals 10 as inserts and the flat cable 6 is connected to the terminals 10 as shown in FIG. 2. The terminal block 6a is sandwiched between the fitting portion 1h formed in the base 1 and a connector 7c of the stator housing 7. The terminals 10 are assembled to the connector 7c.

As shown in FIGS. 2 and 7, the cylinder 1a cooperates with the stator housing 7 fixed to the base 1, the rotor housing 4, and the side housing 5 secured to the rotor housing 4 to define a space depicted at "A" in which the fat cable 6 wound, for example, in a spiral is accommodated.

The flat cable 6 is electrically continuous to the terminals 10 and 11 at its both ends as shown in FIG. 2. The flat cable 6 is in the shape of a thin belt that is insert-molded from a high-fluidity resin material with thin flat conductors as an insert. The flat cable 6 has the terminal block 6a at its outer end of the spiral shape and a terminal block 6b at its inner end. The flat cable 6 formed in the spiral shape is placed on the slide sheet 9 in the space A.

When the terminal block 6a fits to the connector 7c as shown in FIG. 2, the terminal block 6a becomes continuous to the terminals 10 that project downward from the base 1. The terminal block 6b is provided on the inner wall of the space A and connected to the inner end of the flat cable 6. A cord cover 4b is formed on the top surface of the rotor housing 4 and covers soldered connections between a wire harness 12 and the terminals 11. The wire harness 12 is connected to switches for, for example, horns and an air bag apparatus mounted on the steering wheel.

The rotor housing 4 is a doughnut-shaped rotary body having a connector housing 4c that projects upwardly from the top surface of the rotor housing 4. Upon assembling, the connector housing 4c is fitted to a mating connector (not shown) formed under the steering wheel. When the connector housing 4c and projection 4d of FIG. 2 are fitted to the mating connector and a mating hole, respectively, the rotor housing 4 is positioned relative to the steering wheel.

As shown in FIG. 2, when resilient fastening strips 5a of the side housing 5 fit into corresponding engagement grooves 4e formed at a plurality of locations on the outer circumferential surface of the rotor housing 4, the rotor housing 4 is fitted to the side housing 5 so that the rotor housing 4 can rotate together with the steering wheel.

As shown in FIGS. 2 and 7, the rotary body formed of the rotor housing 4 and the side housing 5 covers the flat cable 6 from above, defining an upper half of the space A. The rotor housing 4 has a hollow cylinder 4a formed in the middle thereof into which a steering shaft 2 is inserted. The hollow cylinder 4a has in its inner wall tongues 4g with which engagement straps 13a formed in an attachment 13 are engaged, and projections 4h which abut projecting straps 13b. When the tongues 4g engage the engagement straps 13a and the projections 4h abut the projecting straps 13b, the rotor housing 4 and attachment 13 are coupled into an integral construction such that they can rotate together.

The engagement straps 13a of the attachment 13 and the tongues 4g of the rotor housing 4 are complementary to each other and their locations may be reversed. Likewise, the projecting straps 13b of the attachment 13 and the projections 4h of the rotor housing 4 are also complementary to each other and their locations may be reversed. In other words, the tongues 4g and projections 4h may be formed on the attachment 13 and the engagement straps 13a and projecting straps 13b may be formed on the rotor housing 4.

The rotor housing 4 is disposed such that the rotor housing 4 is rotatable above the stator housing 7. The attachment 13 is disposed such that the attachment 13 is rotatable under the stator housing 7. The rotor housing 4 is coupled to the attachment 13 with the stator housing 7 sandwiched therebetween, thereby allowing the rotor housing 4 and attachment 13 to rotate together.

As shown in FIGS. 2 and 7, the attachment 13 is formed with a stepped sliding surface 13d that is in slide contact with the stator housing 7. The sliding surface 13d has a ring-shaped groove 13e formed therein to reduce an area of the attachment in slide contact with the stator housing 7. A grease may be put in the groove 13e so as to reduce sliding resistance between the attachment 13 and the stator housing 7.

As shown in FIG. 2, on an upper portion of the side housing 5, there is provided an annular fitting groove 5b into which an outer circumferential wall 4i of the rotor housing 4 is received. The side housing 5 has a cancel cam 5c that projects outwardly from a lower part to extend into the annular groove 1b formed in the base 1. The cancel cam 5c abuts the cancel claw 8d of the turn signal switch 8 to cause the turn signal switch 8 to return to a neutral position.

Figure 4:
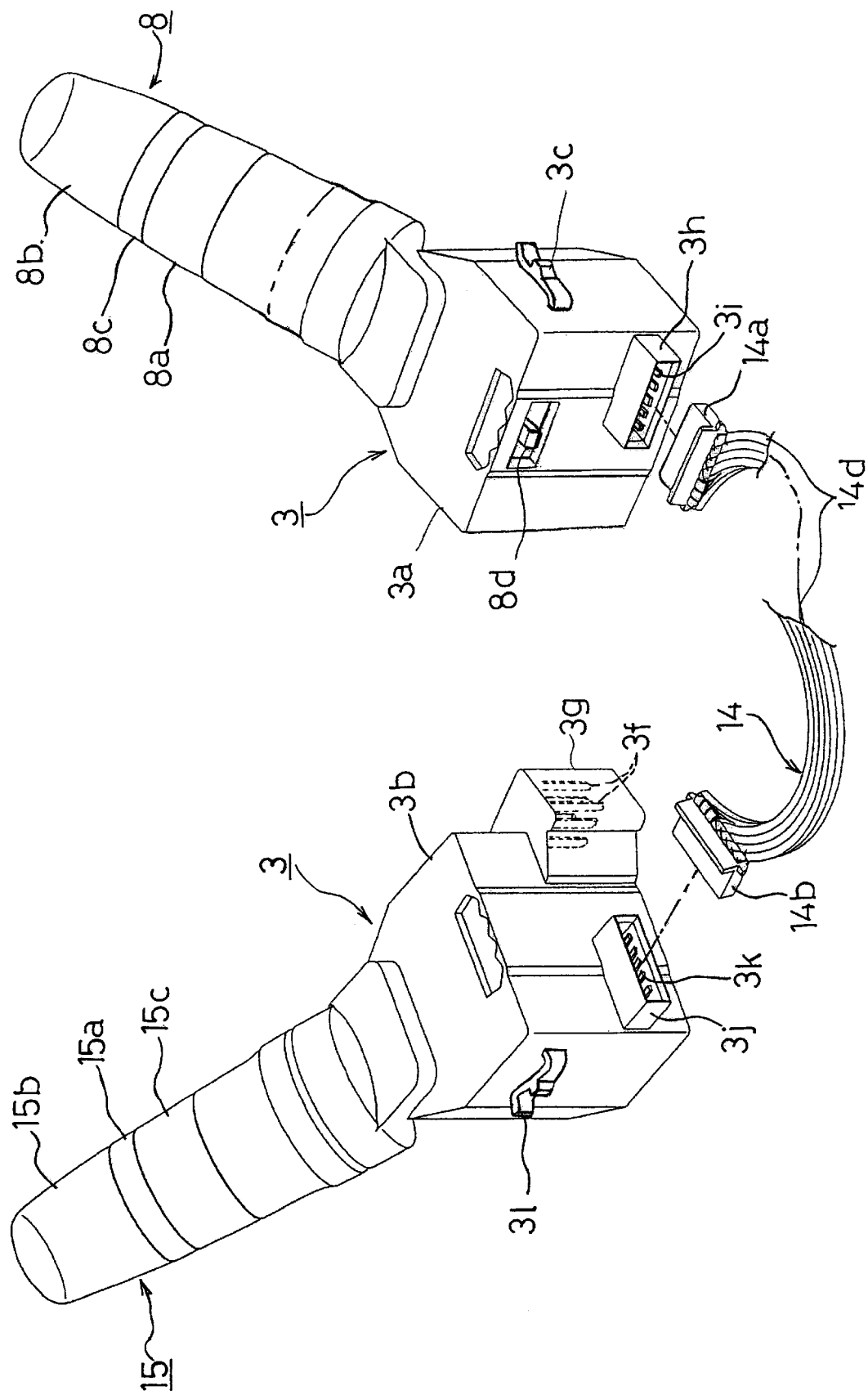
FIG. 4 is an exploded perspective view with a partial cross-sectional view illustrating the first embodiment.
Figure 5:
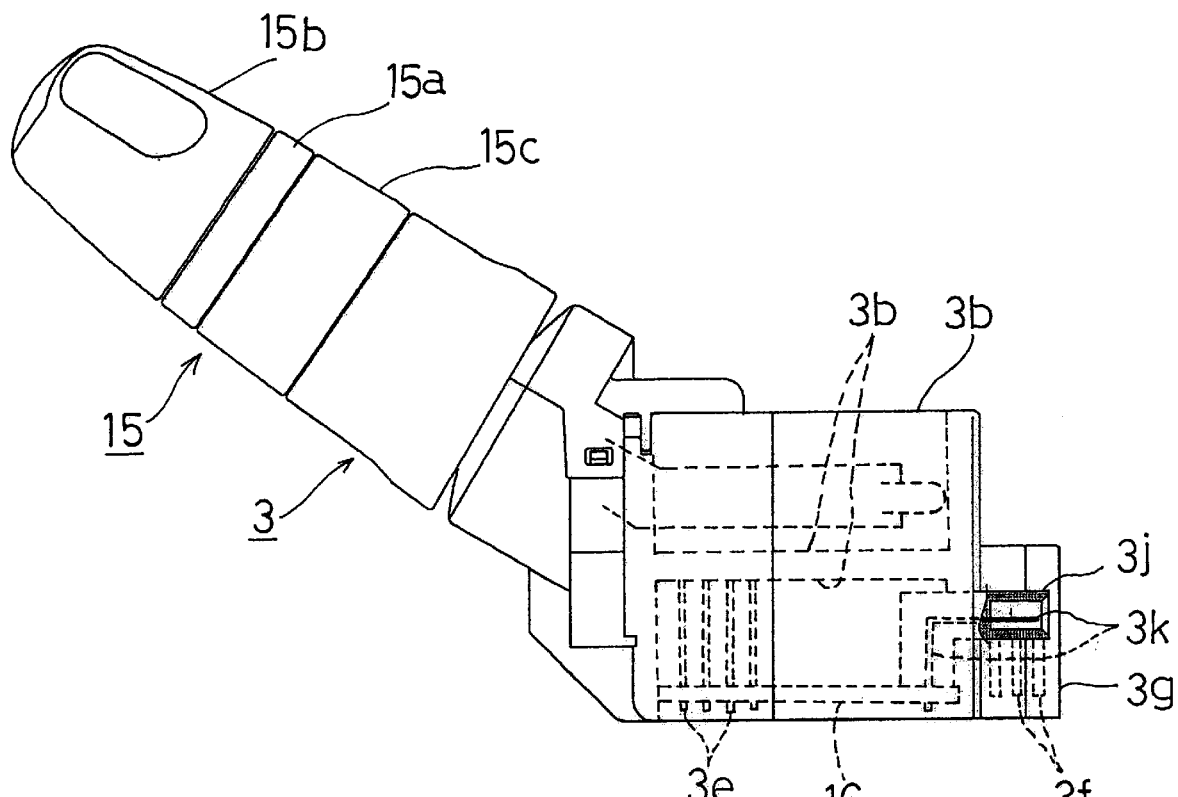
FIG. 5 is a partial side view of a second switch unit according to the first embodiment.

At least one of the first switch unit 3a and the second switch unit 3b has a circuit board 16 and a coupler 3g as shown in FIG. 5. The coupler 3g has terminals 3f that electrically connect to a power supply and electrical circuits and the like provided on the outside of the combination switch 3. For example, the combination switch 3 has the coupler 3g, connected to the power supply, only on the second switch unit 3b side as shown in FIG. 4. The coupler 3g is a common member through which electrical connections are made between the power supply and, for example, the turn signal switch 8 provided on the first switch unit 3a and, between power supply and, for example, the wiper/washer switch 15 provided on the second switch unit 3b.

The first switch unit 3a has a first connector 3h that faces the first recess 1i formed in the base 1. The second switch unit 3b has a second connector 3j that faces the second recess 1j formed in the base 1. As shown in FIG. 4, the first and second connectors 3h and 3j are connected to first and second relay connectors 14a and 14b of the conductor 14 in the form of, for example, cables covered with an insulating material.

The first and second switch units 3a and 3b have resilient fastening members 3c and 3l integrally formed on the left and right side walls, respectively, as shown in FIG. 4. When the resilient fastening members 3c and 3l are engaged with engagement portions, not shown, in the first and second recesses 1i and 1j, formed in the base 1 respectively, the first switch unit 3a and the second switch unit 3b are fixed to the base 1. At this moment, terminals 3i of the first connector 3h of, for example, the turn signal switch 8 are connected to terminals 3k of the second connector 3j of the second switch unit 3b through the conductor 14.

As shown in FIG. 5, the terminals 3k projects at its one end into the second connector 3j and is soldered at its other end to the circuit board 16. The circuit board 16 supports thereon electrical components, lead terminals 3e, terminals 3k, and conductors, not shown. The electrical components form an electrical circuit for the wiper/washer switch 15. The lead terminals 3e are electrically continuous to the fixed contacts provided on the electrode board 3d. The conductors connect the terminal 3k and the lead terminals 3e to the terminals 3f of the coupler 3g.

The second connector 3j fits into the second recess 1j formed in the base 1, the second recess 1j guiding the second connector 3j into fitting engagement with the second relay connector 14b of the conductor 14 as shown in FIGS. 3 and 4. The conductor 14 includes a cable 14d that has female terminals 14c connected at both ends of the cable 14d. The female terminals 14c fit to the male terminals 3i of the first connector 3h and to male terminals 3k of the second connector 3j when they are assembled. The conductor 14 is disposed under the cylindrical outer circumferential surface 7f of the stator housing 7 as shown in FIGS. 2 and 3. The conductor 14 is supported and covered by the cable cover 17 fixed to the stator housing 7.

As shown in FIG. 3, the cable cover 17 has a plurality of engagement straps 17a, which are located at left and right ends of and in the middle of the cable cover 17 and are engaged with a plurality of tongues 7g formed on the outer circumferential surface 7f of the stator housing 7. The cable cover 17 is fixed to the stator housing 7 when the engagement straps 17a engage the tongues 7g.

The cable cover 17 has connector engagement straps 17b and 17c formed thereon and engagement holes 17d and 17e formed therein. The connector engagement straps 17b and 17c engage fastening tongues 14e and 14f, respectively, which are formed on the left and right sides of the first and second relay connectors 14a and 14b, respectively, of the conductor 14. The engagement holes 17d and 17e engage projections 14g and 14h formed on the underside of the first and second relay connectors 14a and 14b, respectively. The connector engagement straps 17b and 17c are formed with elongated holes 17h and 17i therein, respectively, being longer than the vertical dimension of the fastening tongues 14e and 14f of the first and second relay connectors 14a and 14b, respectively, so that the fastening tongues 14e and 14f can marginally move vertically.

The fastening holes 17d and 17e have lateral dimensions longer than the lateral length of projections 14g and 14h, so that the projections 14g and 14h of the first and second relay connectors 14a and 14b can move marginally laterally. The connector engagement straps 17b and 17c can resiliently deform laterally in cooperation with the laterally long dimension of the fastening holes 17d and 17e, facilitating the first and second relay connectors 14a and 14b to move somewhat laterally.

As described above, the first and second relay connector 14a and 14b are held by the cable cover 17 so that the first and second relay connectors 14a and 14b can move in upward and downward directions and in left and right directions. Thus, when the first and second switch units 3a and 3b are attached to the base 1 on which the rotary connector R is fixed, if the positions of the first and second connectors 3h and 3j deviate with respect to the first and second relay connectors 14a and 14b, the first and second relay connectors 14a and 14b can move in the upward and downward directions and in left and right directions.

The fastening tongues 14e and 14f engage the engagement straps 17b and 17c that can flex to describe a curve. Thus, even if the positions of the first and second connectors 3h and 3j deviate laterally with respect to the first and second relay connectors 14a and 14b, respectively, the first and second relay connectors 14a and 14b can move laterally somewhat to fit to the first and second connectors 14a and 14b.

The first and second relay connectors 14a and 14b are sandwiched between the stator housing 7 and the cable cover 17. In addition, the connector engagement straps 17b and 17c cooperate with the engagement holes 17d and 17e in such a way that the first and second relay connectors 14a and 14b are movable slightly in the upward and downward directions and in the left and right directions. The cable 14d is disposed in a space defined between an inner wall 17f and an outer wall 17g of the cable cover 17 as shown in FIG. 2.

The cable cover 17 has a space B having a groove of a U-shaped cross section that is defined by a bottom 17j and the inner wall 17f and outer wall 17g which are formed on the both sides of the bottom 17j. The space B is a doughnut-shaped space for accommodating the conductor 14 therein. The space B extends across the first recess 1i and the second recess 1j.

The steering shaft 2 is rotatably inserted into the steering column, extends through the attachment 13, and is fixed to the steering wheel, so that the attachment 13, rotor housing 4, and side housing 5 always rotate together.

The assembly procedure and operation of the first embodiment of the present invention of the aforementioned configuration will now be described. First, the terminal block 6b at one end of the flat cable 6 is inserted into the rotor housing 4 and soldered to the wire harness 12 as shown in FIG. 2. The cord cover 4b is mounted to the rotor housing 4 such that the cord cover 4b covers the soldered portions between the terminal block 6b and the wire harness 12. The terminal block 6b is at the inner end of the flat cable 6 and is fixedly mounted on the inner wall of the rotor housing 4.

The rotor housing 4 is then pushed into the side housing 5. Then, the resilient fastening strips 5a engage the engagement grooves 4e formed in the outer circumferential surface of the rotor housing 4 while at the same time the outer circumferential wall 4i fits into the annular fitting groove 5b so that the rotor housing 4 and the side housing 5 are fixed to each other.

Then, the slide sheet 9 is placed on the stator housing 7. Then, the terminal block 6a at the other end of the flat cable 6 is fitted into the fitting portion 1h and the terminals 10 are fitted into a connector receiving hole. The base 1 is fixed on the upper side of the stator housing 7 to hold the terminal block 6a between the base 1 and the stator housing 7 in a sandwiched relation. Thus, the outer end of the flat cable 6 is fixed on the slide sheet 9 of the stator housing 7. Then, the side housing 5 is inserted into the annular groove 1b so that the flat cable 6 in the shape of a spiral is accommodated in the space A.

A shaft sleeve 13c of the attachment 13 is pushed into the hollow cylinder 4a from under the base 1 so that the engagement straps 13a engage the tongues 4g and the projection straps 13b abut the projections 4h. Thus, the attachment 13 is fixed to the rotor housing 4 so that the attachment 13, the rotor housing 4, and the side housing 5 can rotate together.

The cable 14d of the conductor 14 is inserted between the inner wall 17f and outer wall 17g of the cable cover 17, and the fastening tongues 14e and 14f of the first and second relay connectors 14a and 14b are pushed into the engagement straps 17b and 17c for engagement, respectively. Upon pushing the fastening tongues 14e and 14f into the engagement straps 17b and 17c, respectively, the projections 14g and 14h provided on the underside of the first and second relay connectors 14a and 14b are inserted into the engagement holes 17d and 17e of the cable cover 17, respectively. Thus, the cable 14 is held by the cable cover 17.

As shown in FIG. 3, the engagement straps 17a of the cable cover 17 engage the tongues 7g from under the stator housing 7, so that the cable 14d is disposed under the stator housing 7 as shown in FIG. 6 and the first and second relay connectors 14a and 14b are disposed under the stator housing 7 and under the first and second recesses 1i and 1j of the base 1.

Then, the first switch unit 3a as the turn signal switch 8 is fitted into the first recess 1i of the base 1. The second switch unit 3b as the wiper/washer switch 15 is fitted into the second recess 1j of the base 1. Then, as shown in FIG. 4, the first connector 3h of the first switch unit 3a fits to the first relay connector 14a of the conductor 14 while the second connector 3j of the second switch unit 3b fits to the second relay connector 14b of the conductor 14.

With the fastening strap 1c engaging the bracket of the steering column, the base 1 is secured to the steering column by means of a screw 30. When the connector 12a and connector housing 4c shown in FIG. 1 are fitted into the corresponding mating connectors under the steering wheel and the steering wheel is secured to the steering shaft 2, the rotor housing 4 is placed in position.

The coupler 3g is connected to the power supply connector. A single connector connected primarily to the power supply is connected to a single coupling member, i.e., the coupler 3g to which the first and second switch units 3a and 3b are connected. Thus, the first and second switch units 3a and 3b receive electric power and can operate properly. The combination switch 3 according to the embodiment allows electrical connection to be made at only one location, achieving minimum time required for wiring. The construction of the combination switch 3 reduces the number of components and manufacturing costs.

Second Embodiment

A second embodiment will be described with reference to FIG. 8.

Elements in the second embodiment similar to those in the first embodiment have been given the same reference numerals and the description thereof is omitted. The feature of the second embodiment is that the stator housing 7 and cable cover 17 is constructed in one piece.

Figure 8:
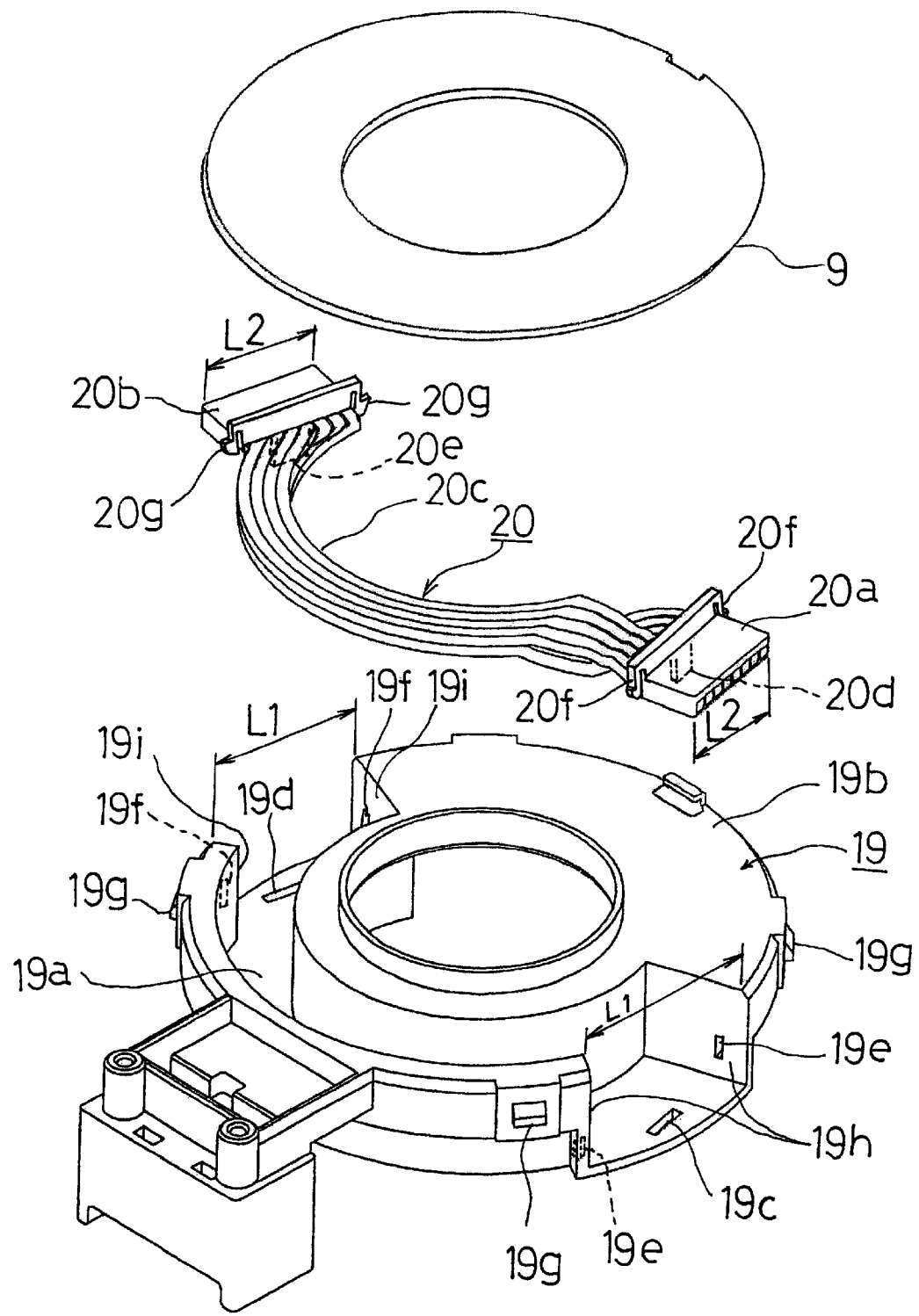
FIG. 8 is an exploded perspective view, illustrating a second embodiment.

Referring to FIG. 8, reference numeral 19 denotes a stator housing that includes a cable 20c having a conductor 20 in the form of cables covered with an insulator, and an accommodating groove 19a that accommodates a first relay connector 20a and a second relay connector 20b therein. Just as in the first embodiment, the stator housing 19 has a plurality of engagement portions 19g, which are formed on an outer circumference of the stator housing 19 and engage engagement portions 1g formed on the lower annular wall 1e of the base 1. The stator housing 19 is fitted into the cylinder 1a by means of the engagement portions 19g.

The accommodating groove 19a is a groove that describes an arc and is recessed from the top surface 19b on which the slide sheet 9 is placed. The accommodating groove 19a has lower fastening holes 19c and 19d and side fastening holes 19e and 19f formed therein on the left and right open end walls 19h and 19i. The bottom fastening holes 19c and 19d engage projections 20d and 20e formed on the undersides of the first and second relay connectors 20a and 20b, respectively. The side fastening holes 19e and 19f engage fastening tongues 20f and 20g formed on the side surfaces of the first and second relay connectors 20a and 20b, respectively. The distance L1 between left and right walls of left and right open end walls 19h and 19i that define longitudinal open ends of the accommodating groove 19a is selected to be somewhat longer than a width L2 of the first and second relay connectors 20a and 20b. The accommodating groove 19a is closed at its upper portion by the slide sheet 9.

The lower fastening holes 19c and 19d have a lateral dimension greater than the width of the projections 20d and 20e such that when the projections 20d and 20e are inserted into the lower fastening holes 19c and 19d, respectively, the projections 20d and 20e can be smoothly inserted vertically and moved somewhat laterally. The fastening tongues 20f and 20g are formed at end portions of, for example, resiliently deformable fastening straps. The deformable fastening straps flex to allow the first and second connectors 20a and 20b to move marginally laterally, thereby making fine adjustment of lateral positions of the first and second connectors 20a and 20b. The fastening tongues 20f and 20g engage side fastening holes 19e and 19f, respectively, which are longer than the vertical dimensions of the fastening tongues 20f and 20g, and therefore the fastening tongues 20f and 20g are movable slightly vertically.

The first and second relay connectors 20a and 20b are disposed at the longitudinal open ends 19h and 19i, respectively, of the accommodating groove 19a such that the first and second relay connectors 20a and 20b are slightly movable in the upward and downward directions and in the leftward and rightward directions. Thus, when the first and second switch units 3a and 3b are mounted to the base 1 on which the rotary connector R is fixed, even if the positions of the first and second connectors 3h and 3j deviate somewhat with respect to the first and second relay connectors 20a and 20b, the first and second relay connectors 20a and 20b can move in the upward and downward directions and in the leftward and rightward directions for complete fitting engagement.

Third Embodiment

A third embodiment will be described with reference to FIG. 9. In the third embodiment, structural elements similar to those in the first and second embodiments have been given the same reference numerals and the description thereof is omitted. The third embodiment is characterized in that the stator housing 19 has a conductor 20 formed in one piece with the housing 19.

Referring to FIG. 9, reference numeral 21 denotes a stator housing that is fitted to the hollow cylinder 1a of the base 1. The stator housing 21 has the conductor 22 that corresponds to the conductor 20 of the second embodiment. The conductor 22 is narrow, long, flat electrically conductive members that are cut to a required length. The conductor 22 is used as an insert when the stator housing 21 is insert-molded. The both longitudinal ends of the conductor 22 project from the outer circumferential surface 21b of the stator housing 21 to form the first and second relay connectors 22a and 22b.

The both longitudinal ends of the conductor 22 are formed into male terminals, which serve as male terminals of the first and second relay connectors 22a and 22b. Instead, the both longitudinal ends of the conductor 22 may be formed into female terminals. Instead of the first and second relay connectors 22a and 22b, the housings of connector may be formed at locations of the longitudinal ends of the conductor 22.

The conductor 22 may have bent portions which are crimped to fix the conductor 22 to the underside of the stator housing 21, and the conductor 22 may be fixed such that the both longitudinal ends thereof project from the outer circumferential surface 21b of the stator housing 21. Alternatively, fastening elements such as resilient fastening straps, crimping straps, and hooks may be formed in one piece with the underside of the stator housing 21 to fix the conductor 22 to the stator housing 21.

Still alternatively, the conductor 22 may be mounted to the underside of the stator housing 21 by an adhesive tape, or fasteners and screws that are made of a resin material or a metal material. The conductor 22, which takes the form of a plurality of conductive elements, can be fixed by any means as long as the conductive elements are secured to the stator housing 21 and electrically insulated from one another.

Just as in the first embodiment, the stator housing 21 has a plurality of fastening portions 21a formed on the outer circumferential surface 21b, the fastening portions 21a engaging the engagement portions 1g formed in the lower annular wall 1e of the base 1. The stator housing 21 is fitted into the hollow cylinder 1a of the base 1 by means of the fastening portions 21a.

The first and second relay connectors 22a and 22b fit into the first and second connectors 3h and 3j in the first and second switch units 3a and 3b, respectively. The first and second connectors 3h and 3j have, for example, female terminals and the first and second relay connectors 22a and 22b have, for example, male terminals.

When the first and second switch units 3a and 3b are fitted into the first and second recesses 1i and 1j in the base 1 on which the rotary connector R is fixed, the first and second connectors 3h and 3j fit to the first and second relay connector 22a and 22b.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An on-vehicle combination switch having a base (1) that is attached to a steering column and have a first recess (1i) and a second recess (1j) formed on left and right sides of the base (1), a first switch unit (3a) attached into the first recess (1i), a second switch unit (3b) attached into the second recess (1j), and a rotary connector (R) that connects between a steering wheel and a vehicle body through a flat cable (6) wound in a space (A) defined by a stator housing (7, 19) and a rotor housing (4) rotatably assembled to the stator housing (7, 19), wherein the first switch unit (3a) has a first connector (3h) oriented toward the first recess (1i) and the second switch unit (3b) has a second connector (3j) oriented toward the second recess (1j);

wherein a conductor (14, 20, 22) is provided to make electrical connection between the first switch unit (3a) and the second switch unit (3b), the conductor having a relay connector (14a, 20 a, 22a) at an opposite end thereof, the first relay connector (14a, 20a, 22a) fitting to the first connector (3h) and the second relay connector (14a, 20a, 22a) fitting to the second connector (3j);

wherein the conductor (14, 20, 22) is provided in the stator housing (17) of the rotary connector (R);

wherein the stator housing (7) has a cable cover (17) that covers the conductor (14);

wherein the cable cover (17) has an engagement strap (17a) though which the cable cover (17) is attached to an underside of the base (1) of the stator housing (7);

wherein the conductor (14) includes a cable (14d) having the first relay connector (14a) at one end thereof and the second relay connector (14b) at the other end thereof, the cable (14d) being covered by the cable cover (17); and wherein the first relay connector (14a) faces the first switch unit (3a) and the second relay connector (14b) faces the second switch unit (3b).

2. An on-vehicle combination switch having a base (1) that is attached to a steering column and have a first recess (1a) and a second recess (1j) formed on left and right sides of the base (1), a first switch unit (3a) attached into the first recess (1i), a second switch unit (3b) attached into the second recess (1j), and a rotary connector (R) that connects between a steering wheel and a vehicle body through a flat cable (6) wound in a space (A) defined by a stator housing (7, 19) and a rotor housing (4) rotatably assembled to the stator housing (7, 19), wherein the first switch unit (3a) has a first connector (3h) oriented toward the first recess (1i) and the second switch unit (3b) has a second connector (3j) oriented toward the second recess (1j);

wherein a conductor (14, 20, 22) is provided to make electrical connection between the first switch unit (3a) and the second switch unit (3b), the conductor having a first relay connector (14a, 20a, 22a) at one end thereof and a second relay connector (14b, 20b, 22b) at an opposite end thereof, the first relay connector (14a, 20a, 22a) fitting to the first connector (3h) and the second relay connector (14b, 20b, 22b) fitting to the second connector (3j);

wherein the conductor (14, 20 ,22) is provided in the stator housing (17) of the rotary connector (R);

wherein the stator housing (7) has a cable cover (17) that covers the conductor (14); and wherein the first relay connector (14a) is disposed at a lower portion of the first recess (1i) and the second relay connector (14b) is disposed at a lower portion of the second recess (1j), the first and second relay connectors (14a, 14b) having base portions and tips, the base portions being supported on either the cable cover (17) or the stator housing (7) so that the first and second relay connectors (14a, 14b) are marginally movable upward and downward and leftward and rightward, and the tips projecting radially outwardly of the stator housing (7).

3. An on-vehicle combination switch having a base (1) that is attached to a steering column and have a first recess (ij) and a second recess (1j) formed on left and right sides of the base (1), a first switch unit (3a) attached into the first recess (1i), a second switch unit (3b) attached into the second recess (1j), and a rotary connector (R) that connects between a steering wheel and a vehicle body through a flat cable (6) wound in a space (A) defined by a stator housing (7, 19) and a rotor housing (4) rotatably assembled to the stator housing (7, 19), wherein the first switch unit (3a) has a first connector (3h) oriented toward the first recess (1i) and the second switch unit (3b) has a second connector (3j) oriented toward the second recess (1j);

wherein a conductor (14, 20 ,22) is provided to make electrical connection between the first switch unit (3a) and the second switch unit (3b), the conductor having a first relay connector (14b, 20b, 22b) at an opposite end thereof, the first relay connector (14a, 20a, 22a) fitting to the first connector (3h) and the second relay connector (14b, 20b, 22b) fitting to the second connector (3j);

wherein the conductor (14, 20, 22) is provided in the stator housing (17) of the rotary connector (R); and wherein the stator housing (19) has an accommodating grove (19a) formed in a top surface thereof, the accommodating groove (19a) accommodating the conductor (20) therein.

4. The on-vehicle combination switch according to claim 3, wherein the accommodating grove (19a) in the stator housing (19) is closed by a slide sheet (9) that lies under the flat cable (6) of the rotary connector (R).

5. An on vehicle combination switch having a base (1) that is attached to a steering column and have a first recess (1i) and a second recess (1j) formed on left sides of the base (1), a first switch unit (3*a*) attached into the first recess (1*i*), a second switch unit (3*b*) attached into the second recess (1*j*), and a rotary connector (R) that connects between a steering wheel and a vehicle body through a flat cable (6) wound in a space (A) defined by a stator housing (7, 19) and a rotor housing (4) rotatably assembled to the stator housing (7, 19), wherein the first switch unit (3*a*) has a first connector (3*h*) toward the first recess (1*i*) and the second switch unit (3*b*) has a second connector (3*j*) oriented toward the second recess (1*j*);

wherein a conductor (14, 20, 22) is provided to make electrical connection between the first switch unit (3*a*) and the second switch unit (3*b*), the conductor having a first relay connector (14*a*, 20*a*, 22*a*) at one end thereof and a second relay connector (14*b*, 20*b*, 22*b*) at an opposite end thereof, the first relay connector (14*a*, 20*a*, 22*a*) fitting to the first connector (3*h*) and the second relay connector (14*b*, 20*b*, 22*b*) fitting to the second connector (3*j*);

wherein the conductor (14, 20, 22) is provided in the stator housing (17) of the rotary connector (r); and wherein the stator housing (21) has the conductor (22) and the first and second relay connectors (20*a*, 20*b*)secured thereto, the first and second relay connectors (20*a*, 20*b*) being part of the conductor (22) and projecting radially outwardly from an outer circumferential surface (21*b*) of the stator housing (21).

\* \* \* \* \*

UNITED STATES PATENT AND TRADEMARK OFFICE
CERTIFICATE OF CORRECTION

PATENT NO.     : 6,462,290 B1
DATED          : October 8, 2002
INVENTOR(S)    : Tsuyoshi Matsumoto It is certified that error appears in the above-identified patent and that said Letters Patent is hereby corrected as shown below:

Column 11,
Line 40, "a relay connector (14*a*, 20 *a*, 22*a*,)" should read -- a first relay (14*a*, 20*a*, 22*a*,) at one end and thereof and a second relay connector (14*b*, 20*b*, 22*b*) --.

Column 12,
Line 18, "(14, 20 ,22) should read -- (14, 20, 22) --.
Line 35, "(i*j*)" should read -- (l*i*) --.
Line 47, "(14, 20 ,22) should read -- (14, 20, 22) --.
Line 50, "(14*b*, 20*b*, 22*b*) at the opposite" should read -- (14*a*, 20*a*, 22*a*) at one end thereof and a second relay connector (14*b*, 20*b*, 22*b*) at the opposite --.
Line 65, "on vehicle" should read -- on-vehicle --.

Column 13,
Line 8, "(3*h*) toward" should read -- (3*h*) oriented toward --.

Column 14,
Line 10, "(20*a*, 20*b*)secure" should read -- (20*a*, 20*b*) secure --.

Signed and Sealed this

Twenty-ninth Day of July, 2003

JAMES E. ROGAN
*Director of the United States Patent and Trademark Office*